(12) United States Patent
Mayer et al.

(10) Patent No.: US 6,472,658 B2
(45) Date of Patent: Oct. 29, 2002

(54) PHOTOELECTRIC POSITION MEASURING SYSTEM THAT OPTIMIZES MODULATION OF A SCANNING DEVICE AND THE INTENSITY OF A REFERENCE MARK SIGNAL

(75) Inventors: Elmar Mayer, Tacherting/Reit; Wolfgang Holzapfel, Obing; Andreas Franz, Trostberg, all of (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 09/832,358

(22) Filed: Apr. 9, 2001

(65) Prior Publication Data

US 2002/0011559 A1 Jan. 31, 2002

Related U.S. Application Data

(63) Continuation of application No. 09/208,127, filed on Dec. 9, 1998, now abandoned.

(30) Foreign Application Priority Data

Dec. 10, 1997 (DE) .......................... 197 54 595

(51) Int. Cl.$^7$ ................................. H01J 3/14
(52) U.S. Cl. .............................. 250/237 G; 250/231.14; 356/616
(58) Field of Search ................. 250/237 G, 237 R, 250/539.29, 559.14, 559.13, 231.13, 231.14, 231.18; 359/565–576; 356/356, 373, 400, 401, 616, 622

(56) References Cited

U.S. PATENT DOCUMENTS

| 3,985,448 A | 10/1976 | Wiklund et al. |
| 4,708,437 A | * 11/1987 | Kraus ............... 359/572 |
| 5,067,816 A | 11/1991 | Ichikawa |
| 5,155,355 A | 10/1992 | Kabaya |
| 5,559,599 A | 9/1996 | Michel |
| 5,576,537 A | 11/1996 | Holzapfel et al. |
| 5,880,882 A | 3/1999 | Michel et al. |

FOREIGN PATENT DOCUMENTS

| DE | 23 62 731 | 6/1975 |
| DE | 25 01 373 | 7/1975 |
| DE | 27 14 324 | 10/1978 |
| DE | 43 23 712 | 1/1995 |
| EP | 0 729 013 | 8/1996 |

OTHER PUBLICATIONS

R.M. Pattigrew, "Analysis of Grating and Its Application to Displacement Metrology," SPIE vol. 136, 1$^{st}$ European Congress on Optics Applied to Metrology, 1977, pp. 325–333.

B. Wieduwilt, Jena, DDR, "Inkrementales Durchlicht–Langenmessystem," Feinwerktechnik & Messtechnik 97, 1989, pp. 43–46.

* cited by examiner

Primary Examiner—Que T. Le
Assistant Examiner—Thanh X. Luu
(74) Attorney, Agent, or Firm—Brinks Hofer Gilson & Lione

(57) ABSTRACT

An incremental position measuring system in the form of a three-grating sensor is optimized in such a way, that the degree of modulation (M) of the incremental scanning device, as well as the intensity (I) of a reference marker signal are relatively strong. To this end, a phase grating with an effective phase deviation of λ/4 is embodied on a scale 2, as well as a reference marker (R) in the form of an amplitude structure. A compact structure is achieved by the divergent illumination of the grating located in front of the scale.

26 Claims, 5 Drawing Sheets

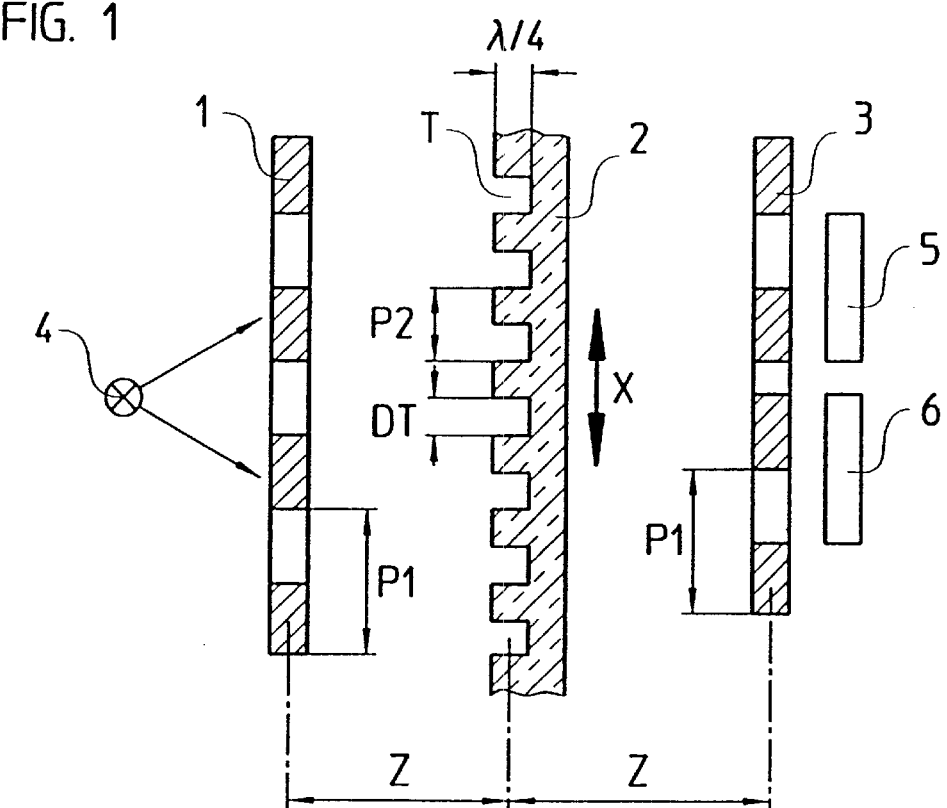
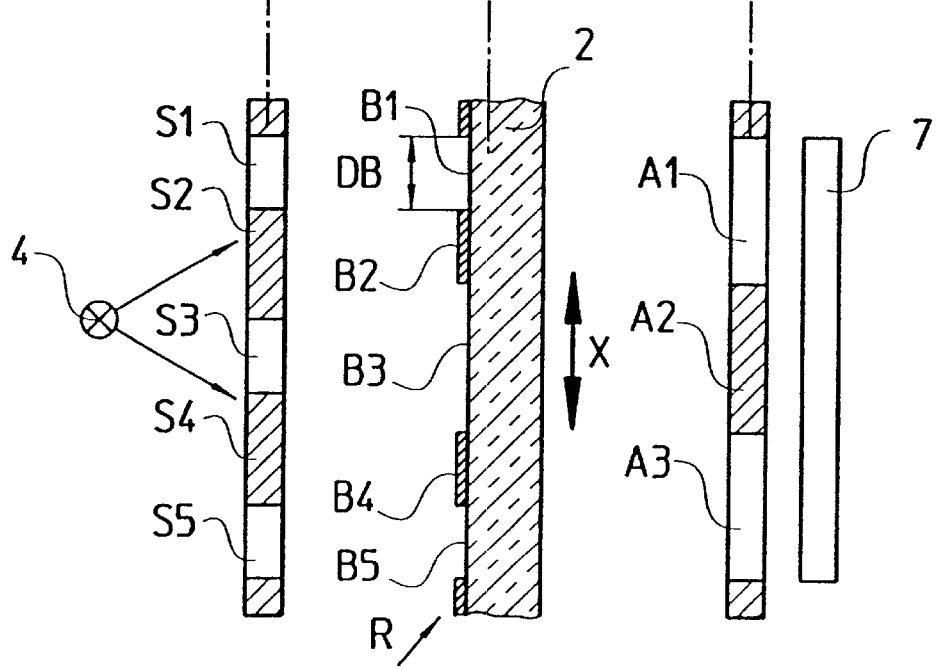

PHOTOELECTRIC POSITION MEASURING SYSTEM THAT OPTIMIZES MODULATION OF A SCANNING DEVICE AND THE INTENSITY OF A REFERENCE MARK SIGNAL

This is a Continuation of application Ser. No. 09/208,127, filed on Dec. 9, 1998, abandoned, which is hereby incorporated by reference herein.

FIELD OF THE INVENTION

This invention relates to a photoelectric position measuring system for measuring the relative position of two elements and, more particularly, to a three-grating sensor that optimizes the degree of modulation of the scanning device and the intensity of a reference marker signal. The invention can be used for the measurement of lengths and angles.

BACKGROUND OF THE INVENTION

Photoelectric measuring systems are used to a great extent with machine tools. To this end, one grating, in the form of a scale, is fastened on a machine element; and a scanning unit, with at least a second grating, is fastened to a further machine element which can be displaced in relation to the first machine element. A mostly collimated light beam from a light source is modulated as a function of the relative displacement of both gratings with respect to each other, and a periodically changing light signal is generated by light-sensitive detector elements when there is relative displacement. Beam portions which are transmitted in the case of a transmitted light system or reflected in the case of a reflective light system by the scale can be evaluated.

In connection with incremental position measuring systems, a reference marker, which fixes an absolute position and therefore permits an absolute association of the incremental counting signals to a zero point on the machine, is often placed on the scale besides the incremental counting track. Such a position measuring system utilizing collimated illumination and an amplitude grating is described, for example, in the magazine entitled "Feinwerktechnik & Meβtechnik" [Precision Mechanics & Measuring Technology] 97 (1989) 1–2 at pages 43 to 46. This reference describes the dependency of the degree of modulation of the scanning signals on the scanning distance, i.e., on the distance between the two grating graduations. A maximum degree of modulation occurs at distances of $$Z = n \cdot \frac{P^2}{\lambda}$$

where Z equals the spacing between the amplitude grating and a second grating along the optical axis, n=0, 1, 2 . . . ; P=the graduation period of the amplitude grating; and λ=the mean radiation wavelength of the light source.

With small graduation periods, the amplitude maximum at n=0 can not be practically used because the graduations can become too easily scratched at such close distances. For this reason a scanning distance Z at n=1 is used. However, it has been shown that at this distance and with the use of amplitude scales, the degree of modulation drops relatively strongly because of the finite divergence of the light source, and a smearing of the intensity modulation occurs at the second grating. This is disadvantageous in view of the highest possible degree of modulation required in connection with present-day demands made on resolution and measuring accuracy. Furthermore, the scanning distance was selected without taking into consideration the reference marker structure.

In an article by Pettygrew "Analysis of Grating Imaging and Its Application to Displacement Metrology", SPIE vol. 136 (1977), pages 325 to 333, the advantages of a three-grating position measuring system are explained where the grating arrangement is illuminated by a divergent light beam, or respectively diffusely, instead by a collimated light beam. The three-grating position measuring system includes a first amplitude grating with the graduation period P1, a second grating in the form of an amplitude grating with a graduation period of P2, and of a third grating in the form of an amplitude grating with the graduation period P1. The position of the planes of maximum modulation on the optical axis is determined by the equation:

$$Z = n \cdot \frac{P1 \cdot P2}{\lambda}$$

where n=0, 1, 2, . . . ; P1=the grating period of the second granting; P2=the grating periods of the first and third grating; λ=the mean radiation wave length of the light source; and P1=2•P2. With this scanning method, the divergence of the light source hardly affects the degree of modulation. However, it has the disadvantage that the intensity of the light beam captured by the detector greatly diminishes with the scanning distance.

Another three-grating sensor is described in the Pettygrew article where the second grating is a phase grating having a bar/gap ratio of 1:1 and an effective phase deviation of λ/2. The zero diffraction order is surpressed by such a grating. It can be seen from FIG. 9 of the Pettygrew article that the degree of modulating of such "diffraction imaging" systems is less than with "geometric imaging" systems in accordance with FIG. 8. It should be mentioned as a further disadvantage that this system only has a sufficient degree of modulation starting at a distance of Z of and P1•P2/λ with P1=P2. Thus, with relatively large graduation periods P1, a relatively large distance Z is required, so that, particularly with divergent illumination the light intensity is low.

A further incremental, interferentially operating position measuring system is described in German Patent Publication DE 27 14 324 C2, wherein a first grating is divergently illuminated and a second grating in the form of a reflecting amplitude scale is arranged at a distance therefrom, and the reflected light again passes through the first grating. To increase the degree of modulation and of the intensity (signal amplitude), the first grating was designed as a phase grating with a λ/4 phase deviation. Here, use was made of the knowledge that, aside from the inevitable reflection losses at air/glass surfaces, with a phase grating almost the entire light passes through the grating. A phase grating with a phase deviation of approximately λ/4 generates light intensities in the +1st, the −1st and in the zero diffraction order and, in regard to its diffraction characteristics, behaves similar to an amplitude grating of the same grating constant while having the advantage of a greater light intensity.

An incremental position measuring system using two gratings is described in European Patent Publication EP 0 729 013 A2. Here, the first grating is a phase grating with a phase deviation of λ/2, and the second grating is an amplitude grating. The first grating is the scale on which, in addition to the periodic phase grating, a reference marker in the form of an amplitude structure has been applied. The illumination of the scale is performed by collimated light which has the disadvantage that a compact structure is not possible. This grating system can be employed and is functional only when collimated light is used.

In order to obtain a compact design of a position measuring system, it is furthermore known to integrate a reference marker, or generally speaking an additional marking, into a periodic incremental graduation track. German Patent Publication DE 25 01 373 A1 shows a possibility for this, in that the periodic pattern is partially changed. To do this, fields of the periodic pattern are omitted in accordance with the teachings of U.S. Pat. No. 3,985,448.

The integration of a reference marker into a periodic phase grating is explained in German Patent Publication DE 23 62 731 A1. A microstructure is overlaid on a phase grating with a phase deviation of $\lambda/2$ and a 1:1 bar/gap ratio, so that defined diffraction orders are amplified at a reference location. Scanning is performed by collimated illumination which, as already mentioned, has the disadvantage that a compact structure cannot be realized.

SUMMARY OF THE INVENTION

It is an object of the invention to provide a position measuring system for the generation of periodic signals, as well as further signals, in particular reference marker signals, which have a high degree of modulation for all signals and which, at the same time, can be realized simply and in a compact structure.

The invention will be explained in greater detail with reference to the preferred embodiments represented in the drawings.

BRIEF DESCRIPTION OF THE DRAWINGS

FIG. 1 is a sectional view of a portion of a position measuring system according to a preferred embodiment of the present invention.

FIG. 2 is a sectional view of another portion of the position measuring system shown in FIG. 1 according to a preferred embodiment of the present invention.

DETAILED DESCRIPTION OF THE PRESENTLY PREFERRED EMBODIMENTS

Figure 3:
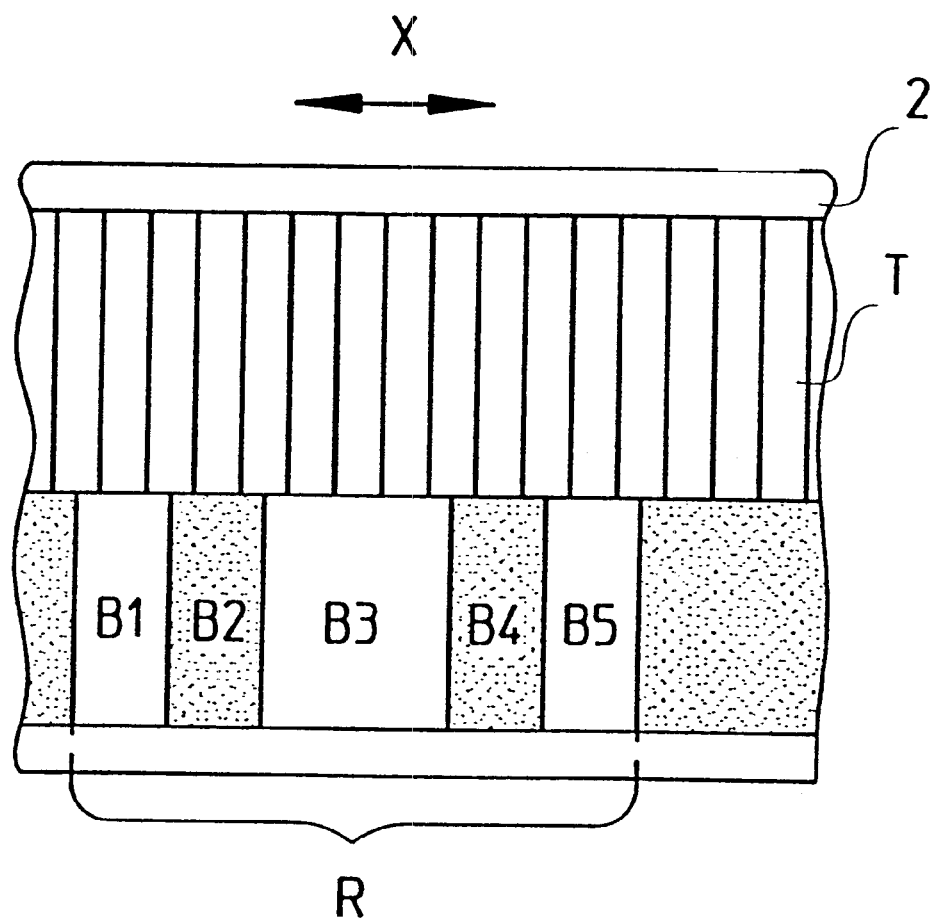
FIG. 3 is a top view on a scale of the position measuring system shown in FIGS. 1 and 2.

A first, particularly advantageous preferred embodiment of the invention is schematically represented in FIGS. 1 to 3. The position measuring system includes a first grating 1, a second grating T disposed on a support 2. In a preferred embodiment, the first grating 1 is in the form of an amplitude grating with a graduation period P1. The first grating is diffusely, in particular divergently, illuminated by a light source 4. The employment of a diffuse illumination has the advantage that no collimator is required, thus allowing a compact structure to be realized. In a preferred embodiment, the light source 4 is an LED with a mean wavelength $\lambda$ of approximately 860 nm, for example.

The light from the light source 4 passes through the first grating 1, falls on the second grating T, which is a phase grating, also passes through it and impinges on the third grating 3 in the form of an amplitude grating with several partial gratings, which are phase-shifted with respect to each other, and on photodetectors 5, 6 arranged behind them. The photodetectors detect the transmitted light from the partial gratings which are assigned to them, so that several scanning signals, which are phase-shifted with respect to each other, are created.

In a preferred embodiment, the graduation period P1 of the first grating 1 and of the partial gratings of the third grating 3 is 40 $\mu$m, and the graduation period P2 of the phase grating T preferably is approximately 20 $\mu$m, for example. Advantageously, the distances Z between the gratings 1, T and 3 are equal.

The sectional view shown in FIG. 1 illustrates the unfolded course of the beams. In actual use, the second grating T is designed as a reflecting grating on a support 2. With such a design a particularly compact structure is achieved, because the first grating 1 is simultaneously also used as the third grating 3.

A three-grating sensor is described in the above-mentioned Pettygrew article where the first grating is designed as an amplitude grating and the second grating is designed as a phase grating, with an effective phase deviation of $\lambda/2$. In accordance with a first preferred embodiment of the present invention, the advantages of both principles are combined in a particularly advantageous manner, namely with regard to the achievable scanning distance Z and the degree of modulation M.

For improved understanding, the support 2 of the phase grating T will hereinafter be identified as the scale 2. For explaining the invention better, FIG. 7 in a graph illustrating the dependency of the degree of modulation on the spacing Z between gratings. The degree of modulation M as a function of the distance in accordance with the prior art, i.e., when using an amplitude grating as the scale, is drawn in dashed lines. At provided grating constants P1 greater than 30 $\mu$m and P2 greater than 15 $\mu$m, the distances Z for the maximum degree of modulation M are disadvantageous, since on the one hand for n=0, the scanning distance z approximately equaling 0 cannot be realized and, on the other hand, the light intensity and therefore the signal amplitude becomes too small for n=1 because of the divergent illumination. This problem is solved with the present invention in that a phase grating T with an effective phase deviation of $\lambda/4$ is employed as the scale 2. Using such a phase grating T, the distances Z of maximum modulation lie at $(n+0.5) \cdot (P1 \cdot P2/\lambda)$. The dependency of the degree of modulation M on the distance Z between graphs has been drawn in solid lines in FIG. 7. It can be seen that the first maximum (n=0) lies at a very high level, and the distance Z can also be advantageously realized in actual use. At this distance of $z=P1 \cdot P2/(2 \cdot \lambda)$, the intensity of the divergent light beams is still sufficient. A further advantage when using a phase grating T in place of an amplitude grating lies in the small loss of light, since almost the entire impinging light is utilized.

As will be described in detail hereinafter, a particular advantage of the present invention can also be seen in that this distance $Z=P1 \cdot P2/(2 \cdot \lambda)$ is also suitable for scanning a reference marker R. In the first preferred embodiment shown in FIG. 1, a reference marker R is arranged on the scale 2 next to the phase grating T. FIG. 2 is a sectional view of another portion of position measuring system shown in FIG. 1 in the plane of the reference marker R. FIG. 3 shows a top view on the scale 2.

In a preferred embodiment, the reference marker R is embodied as amplitude structures B1 to B5 on the scale 2 and is scanned by cast shadows. Scanning a cast shadow corresponds to a purely geometric representation without taking the diffraction of light into consideration. In the course of scanning a cast shadow, the grating to be represented is arranged so close to the plane of projections that diffraction at this distance is negligible and has no effect. The illumination of the phase grating T and of the reference marker R is mutually provided by the divergent light source 4. The width DB of a field B1 to B5 of the reference marker R corresponds preferably to the graduation period P2 or a multiple of the graduation period P2 of the phase grating T, i.e., it is greater than the width DT of a gap in the phase grating T.

Figure 7:
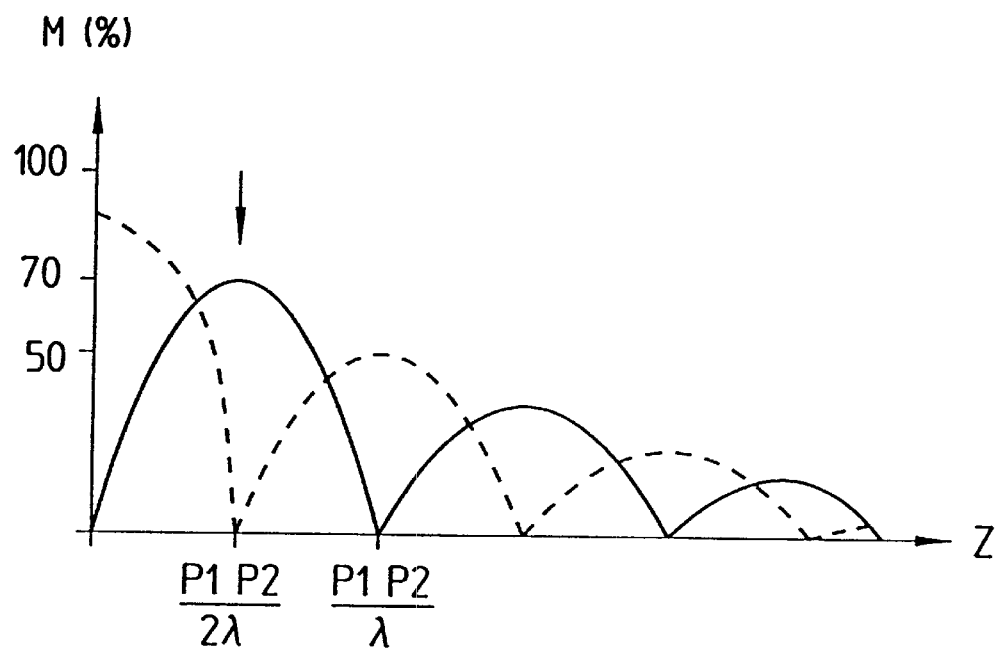
FIG. 7 is a graph illustrating the dependency of the degree of modulation on the spacing Z between gratings.
Figure 8:
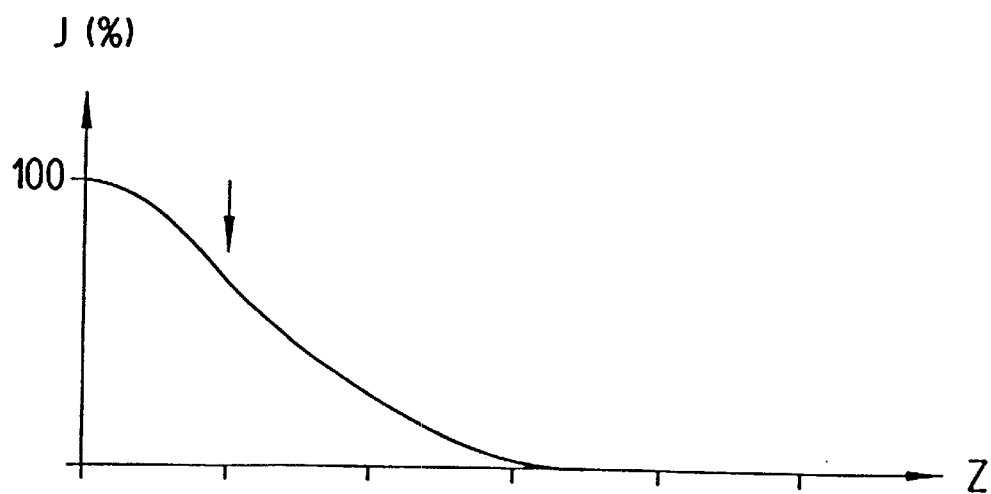
FIG. 8 is a graph illustrating the dependency of the intensity of the reference marker signal on the spacing Z between gratings.

In accordance with the invention, at a distance Z, which results from the predefined parameters P1, P2; a sufficient intensity I, or respectively a good degree of modulation, is achieved even when scanning the reference marker R. FIG. 8 is a graph illustrating the dependency of the intensity I on the distance Z. The operating point resulting from FIG. 7 is identified by an arrow in both FIGS. 7 and 8.

If the scale 2 is used in a transmitted light system, the scale 2 is made of a transparent material, and an irregular sequence of transparent fields B1, B3, B5, as well as non-transparent fields B2, B4 is arranged in the measuring direction X in the area of the reference marker R. In this case the phase grating T consists of a transparent relief structure with gaps and bars.

If the scale 2 is used in an incident light system, the stepped phase grating T is designed to be completely reflecting, and an irregular sequence of reflecting and non-reflecting fields B1 to B5 is arranged in the measuring direction X in the area of the reference marker R.

Figure 4:
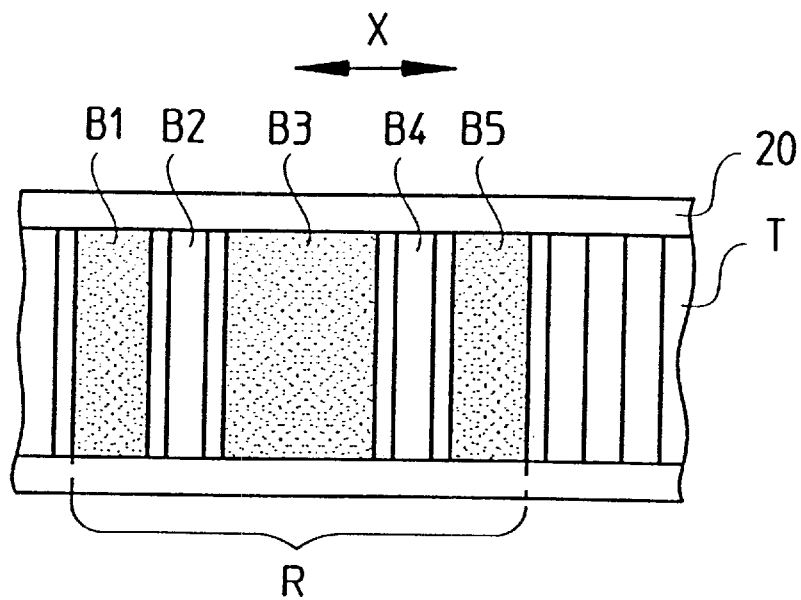
FIG. 4 is a top view of another scale according to a preferred embodiment of the present invention.
Figure 5:
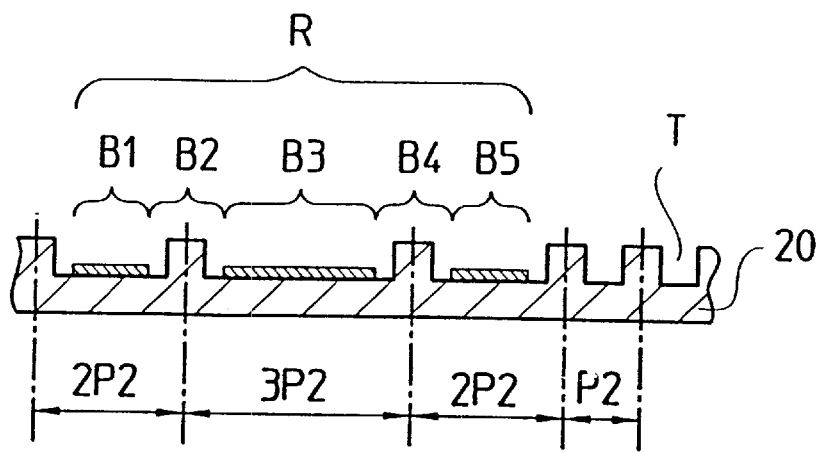
FIG. 5 is a sectional view of the scale shown in FIG. 4.
Figure 6:
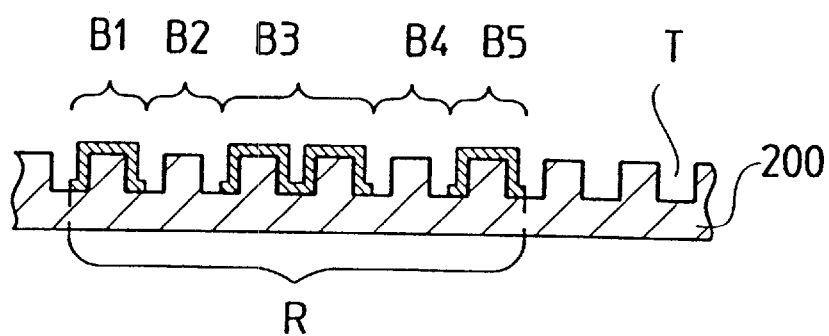
FIG. 6 is a sectional view of another scale according to a preferred embodiment of the present invention.

A particularly compact design of a position measuring system is possible if the reference marker R is integrated into the track of the phase grating T, as shown in the preferred embodiments of FIGS. 4 to 6. FIG. 4 is a top view of the scale 20 in accordance with FIG. 5 for an incident light system. The phase grating T is reflecting over its entire surface, with the exception of the reference marker area R. The fields B1, B3 and B5 of the reference marker R are non-reflecting areas, and the fields B2 and B4 are reflecting areas. The non-reflecting areas B1, B3, B5 can be produced by a partial coating of the surface of the phase grating T with a non-reflecting material.

A sectional view of a further scale 200 is represented in FIG. 6. The difference in comparison with the example in accordance with FIGS. 4 and 5 lies in that the steps of the phase grating T are also provided in the area of the fields B1, B3 and B5, and the surfaces of these steps as well as of the gaps are made non-reflecting, in that they are coated with a non-reflecting material, for example.

The integration of an amplitude structure as a reference marker R in a phase grating T has the advantage over known embodiments such as U.S. Pat. No. 3,985,448 in that a very high contrast between the fields B1, B3 and B5, and the fields B2, B4 is achieved. In contrast to the prior art, the fields of the phase grating T remaining between the fields B1 and B3, as well as B3 and B5, are completely reflective (incident light system) or completely transparent (transmitted light system).

The reference marker R can be integrated at any arbitrary position in the phase grating T. If a reference marker system is required at the start and/or the end of the measuring area, the reference marker R can also follow the phase grating T.

The integration of a reference marker R into the phase grating T can also be provided in that the phase grating T is arranged on one side of the scale 2, and the amplitude structure B of the reference marker R on the back of the scale 2, overlapping the area of the phase grating T.

The invention is not limited to the use of a phase grating with a $\lambda/4$ phase deviation, the phase deviation can also be $\lambda/2$, for example. In dimensioning the gaps in the phase grating T, it is also necessary to take the angle of incidence of the light beams into consideration so that the phase deviation which is effective for the light beam corresponds to the required phase deviation, in particular $\lambda/4$ or $\lambda/2$.

The reference markers known from the prior art are not optimized in their structure for scanning under divergent illumination conditions. In accordance with a preferred embodiment of the invention, three field arrangements S, B, A of reference markers R are matched to each other in such a way that a distinct maximum of a reference pulse signal generated by the scanning is achieved even with divergent, or respectively diffuse illumination. An arrangement of reference marker fields S, B, A is shown by way of example in FIG. 2. The fields S1 to S5 of the first grating 1, the fields B1 to B5 of the scale 2 and the fields A1 to A3 of the third grating 3 are arranged aperiodically in the measuring direction X respectively sequentially, and the sequence of the fields S1 to S5, B1 to B5, A1 to A3 is different. The respective sequence, or distribution, of the fields S1 to S5, B1 to B5, A1 to A3 has been selected so that, in only one reference position, as much light as possible of the transparent fields S1, S3, S5 is reflected, or respectively passed, by the fields B1, B3, B5 and falls through transparent fields A1, A3 on the at least one photodetector 7, and, at the remaining positions as little light as possible falls on photodetector 7. The sequence, or respectively the distribution, of the fields S1 to S5, B1 to B5, A1 to A3 can also be selected in such a way that in only one reference position, as little light as possible falls on photodetector 7, and at the remaining positions, as much light as possible falls on the at least one photodetector 7.

In place of one reference marker R, it is also possible to provide several such reference markers on the scale 2. These reference markers can also be designed so they can be distinguished from each by a coding, or they can directly form a pseudo-random chain (chain code). It is possible to code several reference markers differently by means of their own embodiment or, in a manner known per se, by means of different distances from each other.

It is also possible in a known manner to generate two reference marker signals which, linked to each other, are in particular switched to be different and in this way to generate a resultant reference marker pulse.

In a manner not represented, the light source 4 and the first grating 1 can also be embodied on a common substrate. To this end, the grating 1 can be applied directly to the surface of a flat, light-emitting semiconductor substrate, or the transparent areas of the grating 1 are replaced by areas which emit light in strips. The photodetectors 5, 6, together with the third grating 3, can be designed as a common substrate, in that the partial gratings are applied directly to the surface of a light-sensitive semiconductor substrate, or a semiconductor substrate is used, which is only light sensitive in strips. Such designs of the first grating 1 and the third grating 3 are known per se, for example from U.S. Pat. No. 5,155,355 and German Patent Publication DE 43 23 712 A1.

Light sources and/or photodetectors structured in this way can also be advantageously used for scanning the reference marker R.

Figure 9:
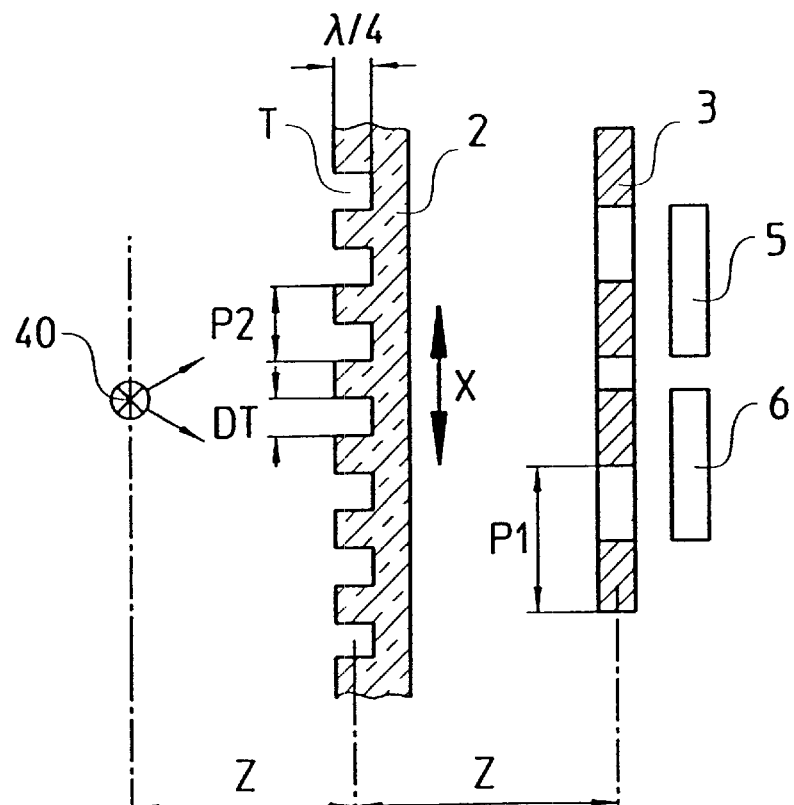
FIG. 9 is a sectional view of a portion of a position measuring system according to another preferred embodiment of the present invention.
Figure 10:
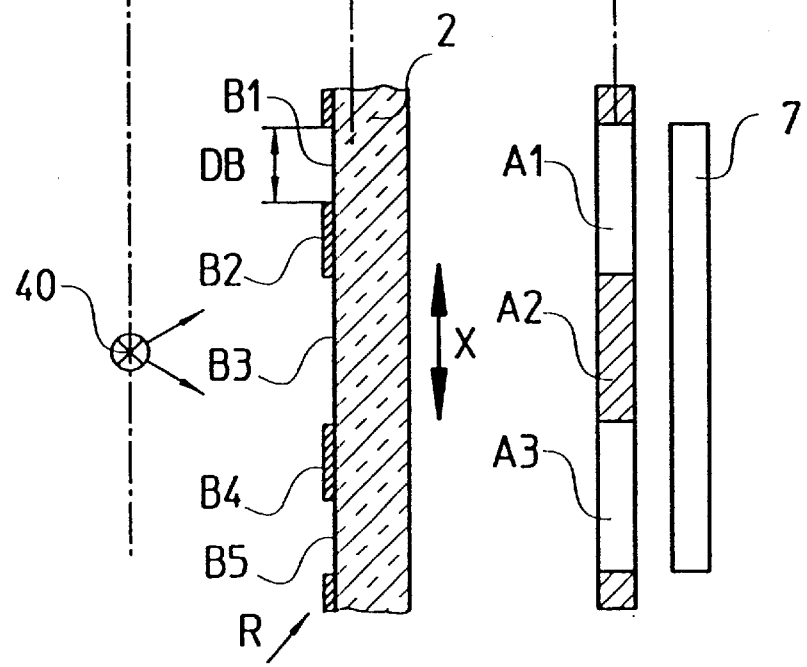
FIG. 10 is a sectional view of another portion of the position measuring system shown in FIG. 9.

FIGS. 9 and 10 are sectional views of another position measuring systems according to a preferred embodiment of the invention. Like reference numerals will be used to designate elements that are like those previously described.

In the first preferred embodiment described above, the first grating 1 is diffusely illuminated by a plane radiator as the light source 4. In this case the plane radiator has a light-emitting surface which, viewed in the measuring direction X, is greater than 0.5•P1. In the preferred embodiment shown in FIGS. 9 and 10, a point light source 40 is employed which directly illuminates the phase grating T and the reference marker R of the scale divergently. Thus, the light source 4 and the first grating 1 are replaced by the point light source 40. In this case the point light source 40 has a light-emitting surface approximately as large as or smaller than 0.5•P1, or respectively equal to P2.

In this preferred embodiment only two amplitude structures B and A exist for generating a reference marker signal. The fields B1 to B5 of the amplitude structure B, which are divergently illuminated at the distance Z by the point light source 40, are matched to the fields A1 to A3 of the amplitude structure A in such a way that a distinct intensity maximum or intensity minimum reaches the photodetector 7 only at the reference position. The two amplitude structures A and B are also arranged at the distance Z from each other.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A position measuring system, the system comprising:
   a light source for providing divergent illumination;
   a first grating structure illuminated by the divergent illumination;
   a second grating structure in the form of a phase grating arranged downstream of the first grating structure;
   a third grating structure arranged downstream of the second grating structure;
   at least one photodetector for detecting a first set of light beams which pass through the first, second and third grating structures and are modulated by the phase grating of the second grating structure;
   a support on which the second grating structure is disposed, the support is arranged displaceably in a measuring direction with relation to the first and third grating structures;
   a reference marker in the form of an amplitude structure disposed on the support and illuminated by a portion of the divergent illumination so that the reference marker generates a second set of light beams that are modulated; and
   at least one photodetector for detecting the second set of modulated light beams, wherein said at least one photodetector generates a signal representative of an absolute position of said reference marker.

2. The position measuring system according to claim 1, wherein the light source is a point light source.

3. The position measuring system according to claim 1 wherein the phase grating has an effective deviation of $\lambda/4$, where $\lambda$=a mean wavelength of the divergent illumination provided by the light source.

4. The position measuring system according to claim 1, wherein the phase grating has an effective deviation of $\lambda/2$, where $\lambda$=a mean wavelength of the divergent illumination provided by the light source.

5. The position measuring system according to claim 1, wherein the amplitude structure of the reference marker is arranged next to the phase grating on the support.

6. The position measuring system according to claim 1, wherein the amplitude structure of the reference marker is arranged on a common track as the phase grating wherein the phase grating underlies the amplitude structure of the reference marker.

7. The position measuring system according to claim 1, wherein the phase grating is a reflecting step grating, and the amplitude structure of the reference marker comprises an aperiodic sequence of reflecting fields and non-reflecting fields arranged in the measuring direction on the phase grating.

8. The position measuring system according to claim 1, wherein the amplitude structure of the reference marker comprises a plurality of fields, each field having a width greater than a width of a gap in the phase grating.

9. The position measuring system according to claim 8, wherein in the width of a field of the amplitude structure of the reference marker is equal to N•P2, wherein N=1,2,3,..., and P2=a graduation period of the phase grating.

10. The position measuring system according to claim 1 wherein the amplitude structure of the reference marker is illuminated by light from a first sequence of fields of said first grating structure, wherein the first sequence of fields is arranged one behind the other in the measuring direction, and is scanned by light from a further sequence of fields of said third grating structure, wherein the further sequence of fields is of different optical properties arranged one behind the other in the measuring direction, wherein the first sequence of fields is divergently illuminated by the light source and wherein at least one photodetector for forming a reference marker signal is associated with the further sequence of fields.

11. The position measuring system of claim 1 wherein the first and third grating structures are the same.

12. A position measuring system, the system comprising:
   a scale with a periodic phase grating and an amplitude structure;
   a light source that illuminates the periodic phase grating and the amplitude structure with divergent illumination;
   a first detector for detecting a first set of light beams modulated by the phase grating; and
   a second detector for detecting a second set of light beams modulated by the amplitude structure, wherein said second detector generates a signal representative of an absolute position of said amplitude structure.

13. The system according to claim 12 wherein the light source is a point light source.

14. A position measuring system, the system comprising:
   a scale with a periodic phase grating and an amplitude structure;
   a light source that illuminates the periodic phase grating and the amplitude structure with divergent illumination, wherein the phase grating has an effective phase deviation of $\lambda/4$, where $\lambda$=a mean wavelength of the divergent illumination provided by the light source;

a first detector for detecting a first set of light beams modulated by the phase grating; and a second detector for detecting a second set of light beams modulated by the amplitude structure, wherein said second detector generates a signal representative of an absolute position of said amplitude structure.

15. A position measuring system, the system comprising:

a scale with a periodic phase grating and an amplitude structure;

a light source that illuminates the periodic phase grating and the amplitude structure with divergent illumination, wherein the phase grating has an effective phase deviation of $\lambda/2$, where $\lambda$=a mean wavelength of the divergent illumination provided by the light source;

a first detector for detecting a first set of light beams modulated by the phase grating; and a second detector for detecting a second set of light beams modulated by the amplitude structure, wherein said second detector generates a signal representative of an absolute position of said amplitude structure.

16. The position measuring system according to claim 12, wherein the amplitude structure is arranged next to the phase grating on the scale.

17. The position measuring system according to claim 12, wherein the amplitude grating is arranged on a common track as the phase grating wherein the phase grating underlies the amplitude structure.

18. A position measuring system, the system comprising:

a scale with a periodic phase grating an amplitude structure;

a light source that illuminates the periodic phase grating and the amplitude structure with divergent illumination, wherein the scale moves relative to the light source along a measuring direction, and wherein the phase grating is a reflecting step grating, and the amplitude structure comprises an aperiodic sequence of reflecting fields and non-reflecting fields arranged in the measuring direction on the phase grating;

a first detector for detecting a first set of light beams modulated by the phase grating; and a second detector for detecting a second set of light beams modulated by the amplitude structure, wherein said second detector generates a signal representative of an absolute position of said amplitude structure.

19. The position measuring system according to claim 12, wherein the amplitude structure comprises a plurality of fields, each field having a width greater than a width of a gap in the phase grating.

20. A position measuring system, the system comprising:

a scale with a periodic phase grating and an amplitude structure comprising a plurality of fields, each field having a width greater than a width of a gap in the phase grating, wherein the width of a field of the amplitude structure is equal to N*P2, wherein N=1,2,3, . . . , and P2=a graduation period of the phase grating;

a light source that illuminates the periodic phase grating and the amplitude structure with divergent illumination;

a first detector for detecting a first set of light beams modulated by the phase grating; and a second detector for detecting a second set of light beams modulated by the amplitude structure, wherein said second detector generates a signal representative of an absolute position of said amplitude structure.

21. A position measuring system, the system comprising:

a scale with a periodic phase grating and an amplitude structure;

a light source that illuminates the periodic phase grating and the amplitude structure with divergent illumination; wherein the scale moves relative to the light source along a measuring direction;

a first detector for detecting a first set of light beams modulated by the phase grating; and a second detector for detecting a second set of light beams modulated by the amplitude structure, wherein said second detector generates a signal representative of an absolute position of said amplitude structure;

wherein the amplitude structure is illuminated by light from a first sequence of fields arranged one behind the other in the measuring direction, and is scanned by light from a further sequence of fields of different optical properties arranged one behind the other in the measuring direction, wherein the first sequence of fields is divergently illuminated by the light source and wherein the second detector is associated with the further sequence of fields.

22. A position measuring the system comprising;

a scale with a periodic phase grating and an amplitude structure;

a light source that illuminates the periodic phase grating and the amplitude structure with divergent illumination;

a first detector for detecting a first set of light beams modulated by the phase grating; and a second detector for detecting a second set of light beams modulated by the amplitude structure, wherein said second detector generates a signal representative of an absolute position of said amplitude structure;

wherein the amplitude structure is an aperiodic structure and wherein between the periodic phase grating of the scale and the first detector is arranged a second periodic grating and between the aperiodic amplitude structure of the scale and the second detector is arranged a second aperiodic structure.

23. The position measuring system according to claim 2, wherein the point light source comprises a light-emitting surface approximately as large as or smaller than 0.5 * P1, wherein P1 is a graduation period of the first grating structure.

24. A position measuring the system comprising;

a scale with a periodic phase grating and an amplitude structure;

a point light source that illuminates the periodic phase grating and the amplitude structure with divergent illumination, wherein the point light source comprises a light-emitting surface approximately as large as or smaller than 0.5 * P1, wherein P1 is a graduation period of the amplitude structure;

a first detector for detecting a first set of light beams modulated by the phase grating; and a second detector for detecting a second set of light beams modulated by the amplitude structure, wherein said second detector generates a signal representative of an absolute position of said amplitude structure.

25. The position measuring system according to claim 1, wherein the amplitude structure affects the amplitude, but not the phase, of the portion of the divergent illumination that illuminates the amplitude structure.

26. A position measuring system, the system comprising;
a scale with a periodic phase grating and an amplitude structure;
a light source that illuminates the periodic phase grating and the amplitude structure with divergent illumination;
a first detector for detecting a first set of light beams modulated by the phase grating; and
a second detector for detecting a second set of light beams modulated by the amplitude structure, wherein said second detector generates a signal representative of an absolute position of said amplitude structure;
wherein the amplitude structure affects the amplitude, but not the phase, of the divergent illumination that illuminates the amplitude structure.

* * * * *

UNITED STATES PATENT AND TRADEMARK OFFICE
CERTIFICATE OF CORRECTION

PATENT NO.     : 6,472,658 B2
DATED          : October 29, 2002
INVENTOR(S)    : Elmar Mayer et al.

It is certified that error appears in the above-identified patent and that said Letters Patent is hereby corrected as shown below:

Column 9,
Line 26, delete "grating" and substitute -- structure -- in its place.
Line 30, after "phase grating" insert -- and --.

Column 10,
Line 24, after "measuring" insert -- system, --.
Line 48, after "measuring" insert -- system, --.

Signed and Sealed this

Twenty-sixth Day of August, 2003

JAMES E. ROGAN
*Director of the United States Patent and Trademark Office*